United States Patent [19]

Mose et al.

[11] Patent Number: 4,818,890
[45] Date of Patent: Apr. 4, 1989

[54] TURBINE HELPER DRIVE APPARATUS

[75] Inventors: Tadao Mose; Akio Hirata; Suzuo Saito, all of Tokyo; Hidehiko Kikuchi, Kawasaki, all of Japan

[73] Assignee: Kabushiki Kaisha Toshiba, Kawasaki, Japan

[21] Appl. No.: 119,710

[22] Filed: Nov. 12, 1987

[30] Foreign Application Priority Data

Nov. 14, 1986 [JP] Japan .................. 61-269536
Dec. 12, 1986 [JP] Japan .................. 61-294632

[51] Int. Cl.⁴ ................ H02P 9/00; F01D 15/10
[52] U.S. Cl. ........................... 290/52; 290/4 C; 290/17; 318/802; 318/808; 307/87; 322/40
[58] Field of Search .............. 290/52, 40 R, 14, 17, 290/1 R, 40 A, 40 B, 40 C, 4 R, 4 A, 4 B, 4 C; 318/798-813, 823, 825, 826, 827, 157; 322/29, 35, 1, 10, 48, 40; 307/87, 85, 86, 64, 66

[56] References Cited

U.S. PATENT DOCUMENTS

| | | | |
|---|---|---|---|
| 3,993,912 | 11/1976 | Ekstrom et al. | 290/17 |
| 4,059,770 | 11/1977 | Mackay | 290/4 C |
| 4,158,801 | 6/1979 | Hirata | 318/809 X |
| 4,292,531 | 9/1981 | Williamson | 318/798 X |
| 4,322,671 | 3/1982 | Kawada et al. | 318/798 |
| 4,330,741 | 5/1982 | Nagase et al. | 318/803 |
| 4,330,743 | 5/1982 | Glennon | 322/29 X |
| 4,437,051 | 3/1984 | Muto et al. | 318/808 |
| 4,503,375 | 3/1985 | Okuyama | 318/802 |
| 4,532,464 | 7/1985 | Igarashi et al. | 318/798 X |
| 4,628,475 | 12/1986 | Azusawa et al. | 318/802 X |
| 4,661,762 | 4/1987 | Baker | 307/81 X |
| 4,673,858 | 6/1987 | Saito | 318/806 X |
| 4,692,671 | 9/1987 | Dishner et al. | 322/40 X |
| 4,695,776 | 9/1987 | Dishner et al. | 290/4 C |

OTHER PUBLICATIONS

Power Electronics & AC Drives by B. K. Bose (Japan) pp. 351-358.

Primary Examiner—William M. Shoop, Jr.
Assistant Examiner—Paul Ip
Attorney, Agent, or Firm—Oblon, Fisher, Spivak, McClelland & Maier

[57] ABSTRACT

A turbine helper drive apparatus includes a turbine for driving a load, a motor coupled to the turbine, and a power converter for controlling an output from the motor based on a predetermined power reference. The power converter controls the motor so that the motor performs either a motoring operation, wherein the motor drives the load together with the turbine, or a regenerating operation, wherein the motor serves as a load for the turbine to generate an electric power.

16 Claims, 7 Drawing Sheets

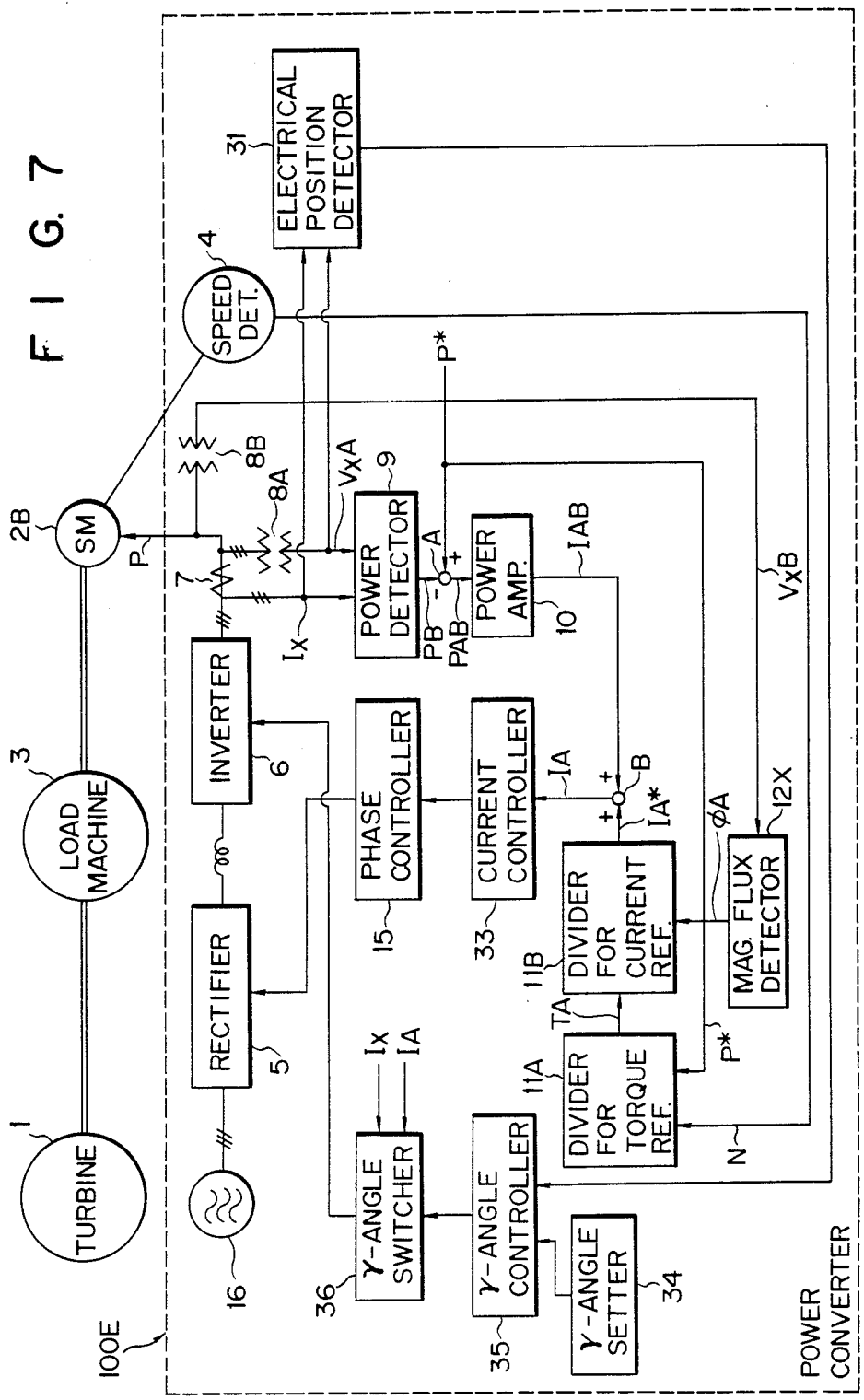

TURBINE HELPER DRIVE APPARATUS

BACKGROUND OF THE INVENTION

The present invention relates to a turbine helper drive apparatus which couples a turbine to an AC motor and adds a generation torque of the AC motor to that of the turbine in a positive or negative direction to drive a load.

A large-scale compressor is driven by a steam turbine, for example. If the capacity of the compressor is to be increased, the capacity of the turbine becomes short, and a large-capacity turbine must be employed to increase the capacity. Alternatively, if the ambient temperature is high during, e.g., the summer months, the efficiency of the turbine is decreased and hence, its output capacity is decreased.

Due to recent discounts in nighttime electric power costs, a motor drive is more economical than a steam turbine during nighttime operation.

For this reason, a demand has arisen for coupling a motor to the turbine to be used as a supplementary power source for the turbine. In order to meet this demand, the present inventors proposed a turbine helper drive apparatus wherein an AC motor, advantageous in high-speed operation, is coupled to a turbine, and an output of the AC motor is controlled to be a predetermined value through a power converter, thereby sharing part of a load of the turbine by the motor.

This proposal corresponds to the following patent applications:

(i) U.S. Patent Application Ser. No. 943,766 filed on Dec. 19, 1986;

(ii) EPC Patent Application No. 86117516.4 filed on Dec. 16, 1986; and (iii) Canadian Patent Application No. 526,073 filed on Dec. 22, 1986.

The above three patent applications have the same contents. All the disclosures of these patents are incorporated in the present application.

Generally, the turbine must output at least its minimum power for the sake of self-cooling, and of course, cannot generate a negative torque.

For this reason, a drive system using a turbine has the following problems. Due to the characteristics of the turbine described above, a minimum load is required, and hence, a nonload operation of the system cannot be performed. In addition, when the system is stopped or decelerated, a deceleration rate is determined depending on a load state, and hence, abrupt deceleration and abrupt stop cannot be performed.

In a conventional helper drive apparatus, when field-weakening control of the accompanying AC motor is performed, precision of power control is undesirably degraded.

SUMMARY OF THE INVENTION

The present invention has been made to solve the above problems, and has as its principal object to provide a turbine helper drive apparatus which allows a system to perform a nonload operation, and also allows abrupt deceleration and abrupt stop operations.

It is another object of the present invention to provide a turbine helper drive apparatus in which an AC motor, advantageous in high-speed operation, is coupled to a turbine, and an output of the AC motor is controlled to be a predetermined value through a power converter, thereby sharing part of a load of the turbine by the motor, wherein even when field-weakening control is performed for the AC motor, high-precision power control can be achieved.

To achieve the above principal object, a helper drive apparatus of the present invention has an AC motor (e.g., an induction motor or a synchronous motor) coupled to a turbine, and a power converter (a voltage inverter, a self-excited current inverter, or an externally-excited current inverter) capable of a generating operation for power-controlling the AC motor. The AC motor generates a motoring direction torque (positive torque) or a retarding torque (negative torque) to the turbine under the power control of the power converter.

Therefore, if a power reference is set to cause the Ac motor to generate a motoring direction torque, this motor can share part of a load of the turbine, and can serve as a supplementary power source for the turbine. Alternatively, the power reference may be set so that the AC motor is operated as a generator to generate a retarding torque, i.e., to serve as a load of the turbine. More specifically, the AC motor capable of generating negative and positive outputs (i.e., serving as both a motor and a generator) is coupled to the turbine which can only generate a positive output, so that a total output of the AC motor and the turbine can be desirably obtained as a positive or negative output. By utilizing the retarding torque of the motor, a nonload operation of the turbine as well as abrupt deceleration and abrupt stop can be performed without accompanying a large energy loss.

To achieve the other object, the helper drive apparatus of the present invention comprises an AC motor (e.g., an induction motor or a synchronous motor), and a power converter (a voltage inverter, a self-excited current inverter, or an externally-excited current inverter) for power-controlling the AC motor. The power converter comprises a power detector for detecting an input power of the AC motor, and a power controller for controlling the input power in correspondence with given preset power. Furthermore, in order to generate auxiliary signals for power control, the power converter further comprises a speed detector for detecting a rotational speed of the AC motor, a magnetic flux detector for detecting a magnetic flux of the Ac motor, a divider for dividing the preset power with the detected speed to generate a torque reference signal, and a divider for dividing the torque reference signal with the detected magnetic flux to generate a current signal.

In the turbine helper drive apparatus with the above arrangement, when the helper drive apparatus is used while performing field-weakening control of the motor, the present power is divided by the detected speed to generate the torque reference signal, and the torque reference signal is divided by the detected magnetic flux to generate the current reference signal (a slip frequency reference in the case of an induction motor) in order to perform high-precision power control. The current reference signal is used as an auxiliary signal for power control.

BRIEF DESCRIPTION OF THE DRAWINGS

FIG. 1A is a block diagram showing an arrangement of a slip frequency controller in FIG. 1;

FIG. 1B is a graph showing a characteristic of the transfer function f(s) of circuit 122 in FIG. 1A;

FIG. 7 is a block diagram showing a turbine helper drive apparatus according to a modification of FIG. 6, in which a signal of magnetic field $\phi A$ of synchronous motor 2B is utilized for current control of motor 2B.

DETAILED DESCRIPTION OF THE PREFERRED EMBODIMENTS

Figure 1:
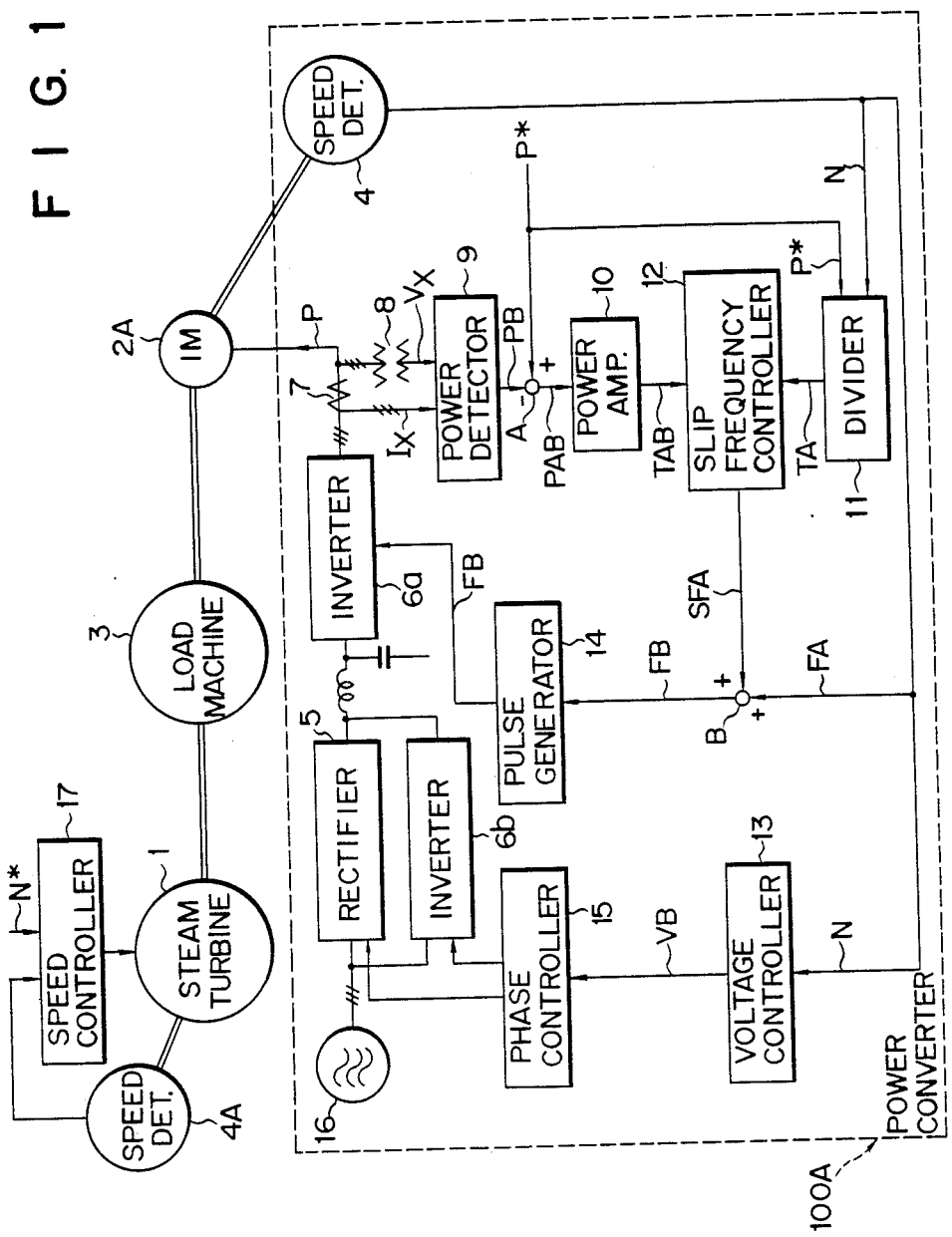
FIG. 1 is a block diagram showing a turbine helper drive apparatus according to an embodiment of the present invention, in which a voltage inverter is utilized.

FIG. 1 shows an embodiment of the present invention.

Referring to FIG. 1, reference numeral 1 denotes a steam turbine; 2A, an induction motor; and 3, a load machine (e.g., a compressor). Induction motor 2A is coupled to a load shaft of load machine 3 and serves as a helper motor for steam turbine 1.

Power converter 100A using a voltage inverter is surrounded by broken lines in FIG. 1. With this power converter 100A, input P of induction motor 2A is controlled to be preset power reference P*.

Power converter 100A comprises speed detector 4, rectifier 5, inverter 6a, inverter 6b for regenerating operation, current transformer 7, potential transformer 8, power detector 9, power amplifier 10, torque reference generating divider 11, slip frequency controller 12, voltage controller 13, pulse generator 14, and phase controller 15. In this embodiment, a slip frequency reference (SFA) is employed as a torque reference.

When positive power reference P* is set, an output from AC power supply 16 is converted into DC power, via rectifier 5. The converted DC power is again converted into AC power having a variable frequency and a variable voltage, via inverter 6a. Then, the AC power is supplied to induction motor 2A. Induction motor 2A is coupled to turbine 1 in a tandem manner, and shares part of a drive power of load machine 3. In other words, AC motor 2A can perform a motoring operation.

The rotational speed of turbine 1 is held at a value corresponding to speed reference N* by speed controller 17 using a mechanical governor. Load distribution, indicating a rate of power shared by turbine 1 to that by motor 2A, is determined by controlling input power P of motor 2A to be a predetermined value. Input power P of motor 2A is controlled to be a predetermined value by power-controlling the power converter (100A) in accordance with power reference P*.

Signals Ix and Vx respectively obtained from current transformer 7 and potential transformer 8 are input to power detector 9. Power detector 9 outputs power feedback signal PB based on a product of in-phase components of sgnals Ix and Vx. Output signal PB is combined with power reference P* at summing point A. Then, deviation PAB (+P*−PB) is converted to torque correction signal TAB through power amplifier 10, and signal TAB is input to slip frequency controller 12.

Power reference P* is also input to divider 11, and is divided with speed signal N. Signal N, output from speed detector 4, represents the speed of the induction motor. Torque command TA, corresponding to power P* designated by speed signal N, is thus obtained. Command TA is input to controller 12.

Controller 12 has an arrangement shown in FIG. 1A, and calculates slip frequency reference SFA based on torque correction signal TAB and torque command signal TA. More specifically, signals TAB and TA are added to each other by adder 121. A sum signal (TAB + TA) is input to amplifier 122 having transfer function f(s) of torque characteristic, as is shown in FIG. 1B. Amplifier 122 outputs slip frequency reference SFA (= f(s)(TAB + TA)).

Calculated slip frequency reference SFA is added to frequency signal FA (equal to speed signal N detected by speed detector 4) at summing point B. The output frequency (FB = FA + SFA) of inverter 6a is thus determined by signal FA through pulse generator 14.

Voltage controller 13 outputs signal VB. Signal VB is so determined to have a voltage/frequency ratio (VB/N) corresponding or proportional to speed signal N detected by speed detector 4. Rectifier 5 is controlled by signal VB through phase controller 15.

Induction motor 2A is torque-controlled through rectifier 5 and inverter 6a, so that input power P of motor 2A is controlled to be power reference P*.

In this manner, when positive power reference P* is set, slip frequency reference SFA becomes positive, and motor 2A performs a motoring operation at a positive slip frequency. In this case, a current flows through AC power supply 16, rectifier 5, inverter 6a, and motor 2A.

When negative power reference P* is set, slip frequency reference SFA becomes negative, and motor 2A is operated at a negative slip frequency. More specifically, motor 2A performs a generating operation as an induction generator. In an energy flow in this case, a mechanical energy output from the turbine is converted to electric power by motor 2A. Then, inverter 6a, serving as a rectifier, regenerates the converted electric power to AC power supply 16, via inverter 6b in regenerating operation.

Figure 2:
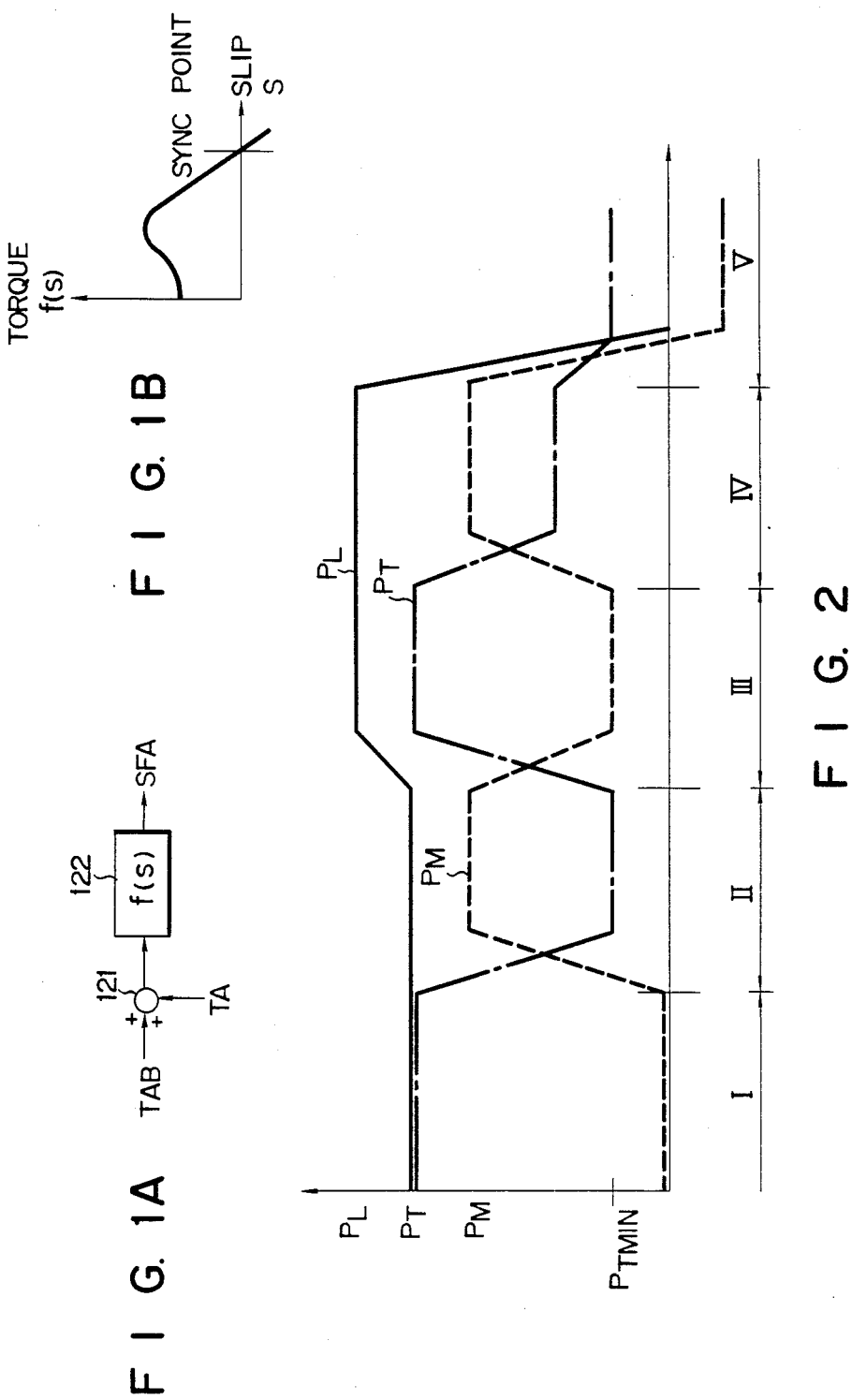
FIG. 2 is a graph showing load characteristics for explaining the operation of the apparatus in FIG. 1.

The operation and advantages of this embodiment will be explained with reference to FIG. 2.

Period I is, e.g., a daytime period during which steam cost is lower than electric power cost, and 100% of turbine power PT is output to load PL. In this case, AC motor power PM is zero. Period II indicates, e.g., a nighttime period during which electric power cost is lower than steam cost, and turbine power PT corresponds to minimum power PTMIN, and AC motor power PM compensates for the reduction in power of the turbine. Similarly, periods III and IV indicate periods during which load PL is increased, and power must be increased. During period III, steam cost is low, and hence, turbine power PT is set to its maximum rated power, and the AC motor compensates for any shortage in the turbine power. During period IV, electric power cost is low, and hence, the AC motor outputs its rated maximum power and the turbine compensates for any shortage in the motor power.

During period V, load PL becomes zero, that is, a plant requires a nonload operation. In a conventional system, load machine 3 must keep minimum load PTMIN for cooling the turbine. However, as indicated by period V in FIG. 2, minimum load PTMIN of the turbine is canceled by the negative output power of the AC motor, and hence, an operation can be performed while load PL of load machine 3 is zero.

More specifically, in a conventional system, load PTMIN is wasted for cooling the turbine although no load is required as a plant itself. According to the present invention, however, power PTMIN for cooling the turbine is converted to electric power to be regenerated using the AC motor. Therefore, energy loss can be reduced to almost zero.

In a conventional turbine drive system, a retarding direction power cannot be output. For this reason, a deceleration rate of the turbine is determined only by load PL, and if load PL is small, a deceleration time is inevitably prolonged. However, according to the present invention, since the AC motor can generate a negative power, i.e., a damping force, deceleration can be performed at high rate, and a deceleration rate can also be controlled.

Figure 3:
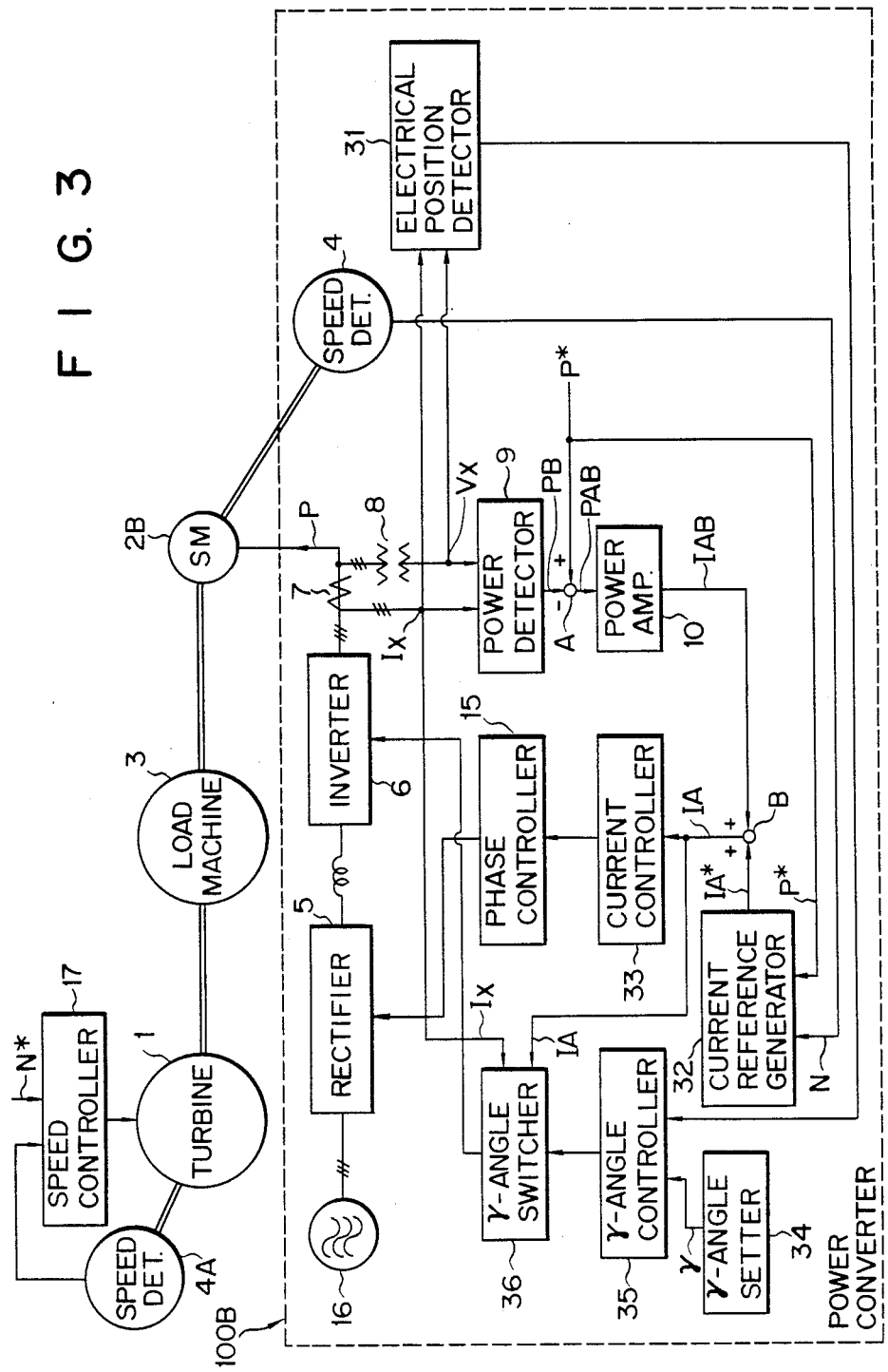
FIG. 3 is a block diagram showing a turbine helper drive apparatus according to a modification of FIG. 1, in which an externally-excited current inverter is utilized.

FIG. 3 shows a modification of FIG. 1.

In FIG. 3, synchronous motor 2B is used as an AC motor for helper-driving the load machine (3). Synchronous motor 2B supplementarily drives turbine 1. Constant p65 -angle control is employed for a control circuit, and an output torque is varied by controlling an output current.

Power converter 100B using an externally-excited current inverter comprises rectifier 5, inverter 6, current reference generator 32, power amplifier 10, current controller 33, phase controller 15, current transformer 7, potential transformer 8, power detector 9, position detector 31, p65 -angle controller 35, speed detector 4, p65 -angle setter 34, and p65 -angle switcher 36.

An output from AC power supply 16 is converted into AC power having a variable frequency and a variable voltage, via rectifier 5 and inverter 6, and the converted AC power is supplied to synchronous motor 2B. Motor 2B is coupled to turbine 1 in a tandem manner, and drives load machine 3.

Speeds of motor 2B and turbine 1 are kept at a value corresponding to speed reference N* by speed controller 17 as a governor for turbine 1, and load distribution, indicating a rate of power shared by turbine to that by motor 2B, is determined by controlling input power P of motor 2B in accordance with power reference P*, in the same manner as in the embodiment of FIG. 1.

Input power P of motor 2B is controlled as follows. Signals Ix and Vx respectively from current transformer 7 and potential transformer 8 are input to power detector 9, and power feedback signal PB is output based on a product of in-phase components of signals Ix and Vx. Output signal PB is combined with power reference P* at summing point A, thus calculating deviation PAB. Calculated deviation PAB is input to power amplifier 10, and then, current reference correction signal IAB is output.

Power reference P* is divided by speed signal N of motor 2B, obtained from speed detector 4, by current reference generator 32, thus generating current reference IA* ($\propto P^*/N$) corresponding to power P designated by speed signal N. Current reference IA* and current reference correction signal IAB are added to each other at summing point B, thus obtaining actual current reference IA. Output current reference IA is supplied to rectifier 5 through current controller 33 and phase controller 15, and rectifier 5 controls motor 2B based on current reference IA.

Position detector 31 electrically detects a magnetic flux position using signals Ix and Vx from transformers 7 and 8 by a conventional method. Then, γ-angle controller 35 controls a γ angle so that the γ angle set by γ-angle setter 35 can be obtained at the detected magnetic flux position. Inverter 6 is controlled by a constant γ angle. γ-angle switcher 36 sets the γ angle as follows. More specifically, switcher 36 discriminates the polarity of current reference IA and the amplitude of output current Ix to determine whether γ is set in a motoring direction or in a regenerating direction. (That is, switcher 36 checks the sign of IA and the amplitude of Ix to switch the angle, so that motor 2B performs either the motoring or generating operation.)

Note that a conventional switching operation of the motoring and regenerating modes is described in detail in the following literature:

B.K. Bose, "Power Electronics & AC Drives", Trans. Toshimasa Taisenji & Haruo Naito, Denki Shoin (Japan), pp. 351-358.

In the modification shown in FIG. 3, an output power of synchronous motor 2B is varied in accordance with the amplitude of a curernt (Ix) flowing through motor 2B based on γ-angle constant control in the thyristor motor system. The polarity of the output power of motor 2B is determined in accordance with whether the γ angle is set to be γ (positive power) or 180°−γ (negative power).

As described above, since the apparatus of FIG. 3 is arranged as the thyristor motor system to output positive and negative powers (motoring and regenerating operations), the same advantage as in the embodiment can be obtained. (Namely, a nonload operation of the turbine as well as abrupt deceleration and abrupt stop can be performed without energy loss.)

Similarly, in the thyristor motor system, as another control method for arbitrarily varying positive and negative powers, an operation power factor of a synchronous motor, i.e., γ, may be varied while maintaining an apparent power, applied to the synchronous motor, constant in order to achieve the object of the present invention. An arrangement therefor is shown in FIG. 4.

Figure 4:
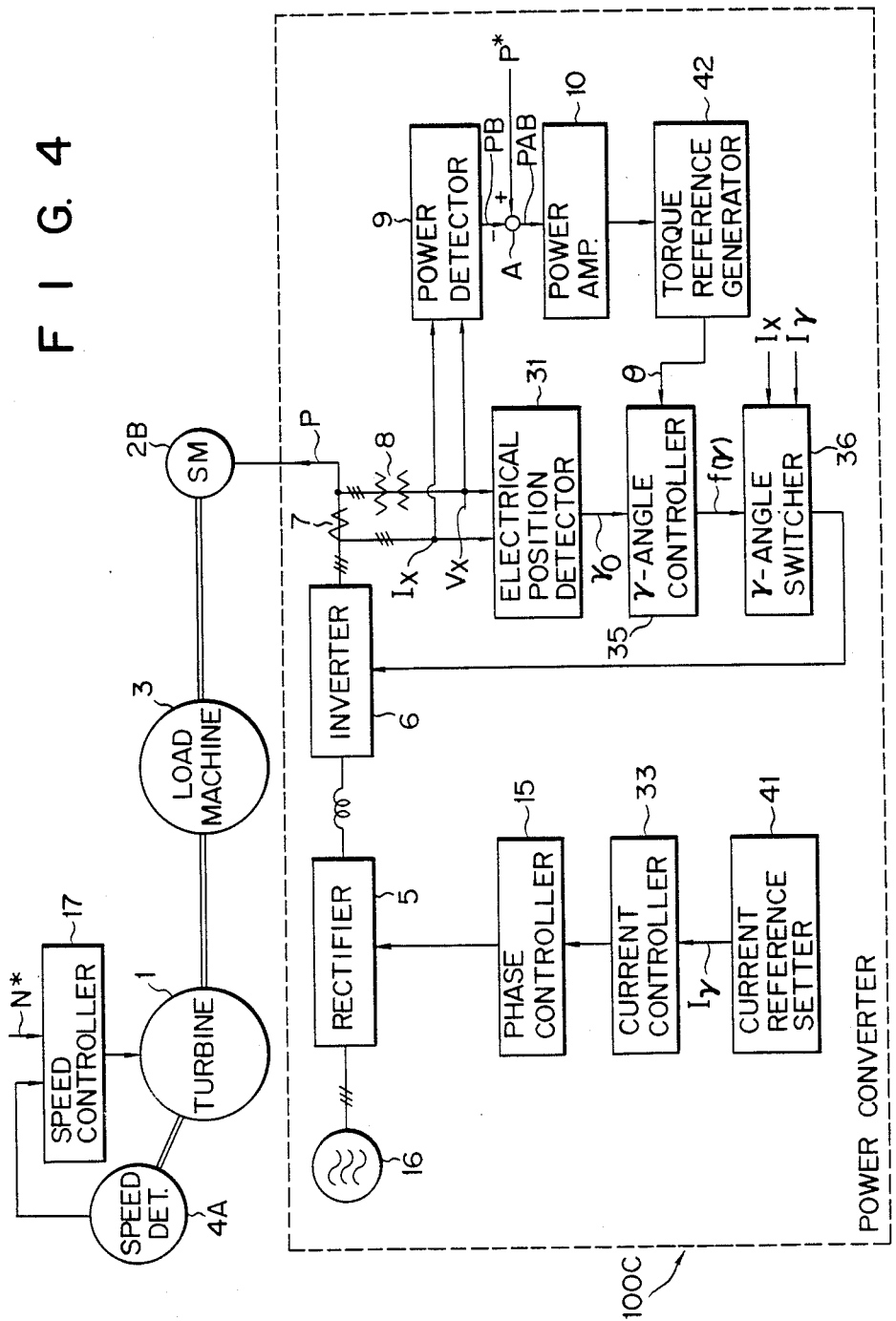
FIG. 4 is a block diagram showing a turbine helper drive apparatus according to another modification of FIG. 1, in which an externally-excited current inverter, different from that in FIG. 3, is utilized.

In FIG. 4, power converter 100C includes an externally-excited current inverter. Current reference Iγ in FIG. 4 corresponds to IA in FIG. 3. A γ angle can be represented by function f(γ) as follows:

$$f(\gamma) = V x I \gamma \cos(\gamma 0 + \theta) \qquad (1)$$

where γ0 indicates an output from position detector 31, and θ indicates an output from torque reference generator 42. Function f(γ) is output from γ-angle controller 35. Function f(γ) takes either a positive or negative value depending on phase angle γ0+γ of function f(γ). If f(γ)>0, a motoring operation is preformed. If f(γ)<0, a regenerating operation is performed. Torque reference θ can be freely changed in accordance with power reference P* input to adder A, and changes in accordance with output PB from power detector 9. Once P* is set, θ is changed in accordance with a detected level (PB) of a load of motor 2B, and the sign of f(γ) can be switched (i.e., motoring and regenerating modes are switched) based on the motor load detection level (PB).

During mode switching between the motoring and regenerating modes, γ-angle switcher 36 is arranged to prevent hunting of mode switching if absolute value |f(γ)| of f(γ) is decreased below a predetermined small value (near zero) during the mode switching between the motoring and regenerating modes. More specifically, switcher 36 is a circuit for inverting the sign of f(γ) when |f(γ)| is decreased to the predetermined value.

Figure 5:
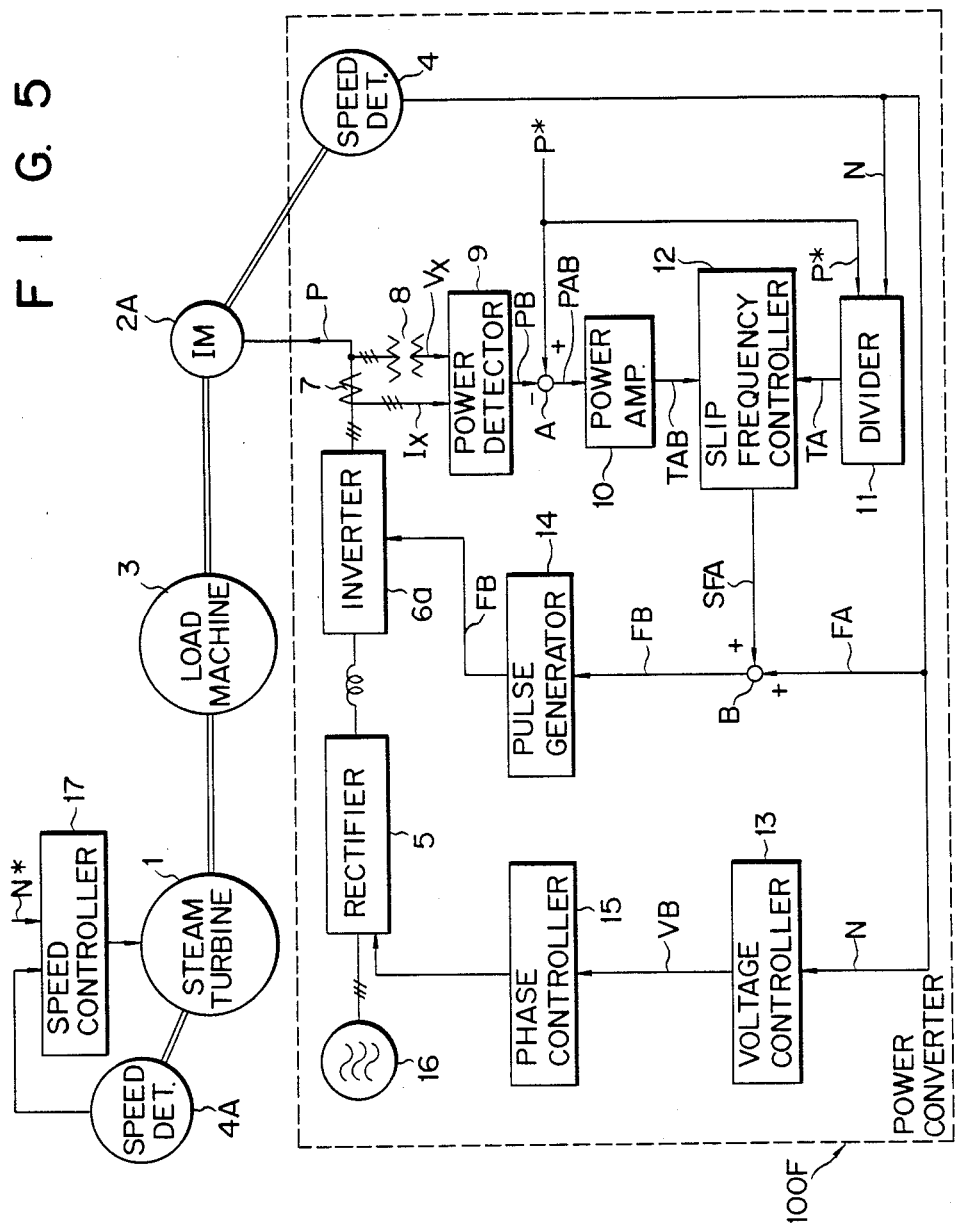
FIG. 5 is a block diagram showing a turbine helper drive apparatus according to still another modification of FIG. 1, in which a self-excited current inverter is utilized.

FIG. 5 shows still another modification of the apparatus shown in FIG. 1. In FIG. 1, power converter 100F comprises a voltage inverter. However, in FIG. 5, power converter 100F comprises a self-excited current inverter. The basic operation of the apparatus of FIG. 5 is the same as FIG. 1.

According to the present invention supported by the embodiment shown in FIGS. 1 to 5, when a load machine temporarily requires a larger load than a normal load or when the capacity of the existing system is increased, since a helper drive apparatus (by the AC motor and the power converter), capable of compensating for a shortage in power that cannot be compensated by the conventional turbine drive apparatus, is arranged, the conventional turbine drive apparatus can be used without substantial modification. More specifically, the apparatus of the present invention can serve as an effective means for compensating for a temporary increase in load or power up of the existing system.

In this case, since input power (P) of a helper AC motor is controlled in accordance with a given preset value (P*), a load share of the motor on the side of the helper drive apparatus can be adjusted to be a desired value. Furthermore, since power control and torque control are performed at the same time, high-precision power control can be achieved without impairing a short response time of motor output control.

As a secondary advantage, since load distribution of the turbine and the helper drive apparatus can be desirably adjusted, it can be determined in consideration of fuel cost, thereby reducing total operation cost. For example, during nighttime operation, the helper drive apparatus is caused to generate a large power using low cost nighttime electric power, while the turbine is used as a supplementary drive.

Furthermore, since the helper drive apparatus (motor) can generate a negative power (regenerating operation), even if the load of a plant coupled to the turbine is smaller than a minimum load of the turbine, the turbine can be stably operated. For this reason, energy used for only cooling the turbine in the conventional apparatus can be saved. In addition, the turbine cooling energy can be regenerated from the motor as a retarding torque, thus allowing abrupt deceleration of the turbine.

Figure 6:
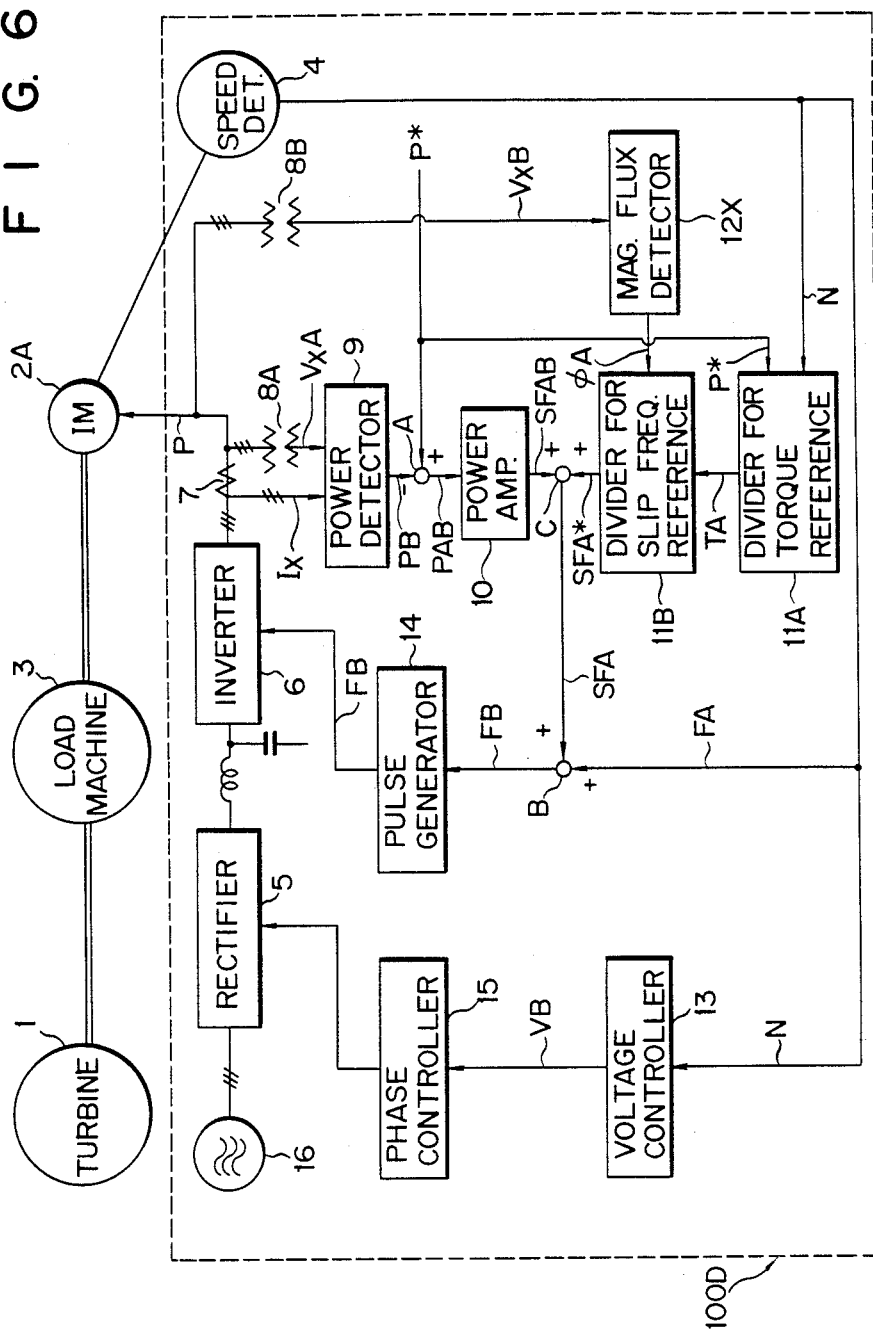
FIG. 6 is a block diagram showing a turbine helper drive apparatus according to another embodiment of the present invention, in which a signal of magnetic field $\phi A$ of induction motor 2A is utilized for slip frequency control of motor 2A.

FIG. 6 shows another embodiment of the present invention.

In FIG. 6, reference numeral 1 denotes a steam turbine; 2A, an induction motor; and 3, a load machine (e.g., a compressor). Induction motor 2A is coupled to a load shaft of load machine 3 and serves as a helper motor of steam turbine 1.

In FIG. 6, power converter 100D is surrounded by broken lines. Converter 100D controls input power P of induction motor 2A to be power reference P*.

Power converter 100D comprises speed detector 4, rectifier 5, inverter 6, current transformer 7, potential transformers 8A and 8B, power detector 9, power amplifier 10, torque reference generating divider 11A, slip frequency reference generating divider 11B, voltage controller 13, pulse generator 14, and phase controller 15. In this embodiment, a slip frequency reference (SFA) is employed as a torque reference.

An output from AC power supply 16 is converted into AC power having a variable frequency and a variable voltage, via rectifier 5 and inverter 6. The converted AC power is supplied to motor 2A. Motor 2A is coupled to turbine 1 through a shaft, and shares part of a drive power of load machine 3.

The rotational speed of turbine 1 is maintained constant by a governor (not shown), and load distribution is determined by controlling input power P to be a predetermined value. input power P of motor 2A is controlled to be the predetermined value by power-controlling the power converter in accordance with power reference P*.

Signals Ix and VxA from transformers 7 and 8A are input to power detector 9. Detector 9 outputs power feedback signal PB based on signals Ix and VxA. Output signal PB is combined with power reference P* at summing point A. Slip frequency correction signal SFAB is generated from deviation PAB (P*- PB) through power amplifier 10.

Power reference P* is input to divider 11A, and is divided by speed signal N of the motor output from speed detector 4, thus generating torque command TA corresponding to power P* designated by speed signal N. Command TA is input to divider 11B (TA ∝ P* /N).

On the other hand, signal VxB (vR, vS, vT) from transformer 8B and speed detector 4 for motor 2A is input to magnetic flux detector 12X. Detector 12X then outputs magnetic flux signal φA based on signal VxB. When motor 2A is a three-phase motor, signal VxB has three-phase voltage components vR, vS, and vT. Detector 12X performs the following integral operation of these voltage components to determine amplitude |φA| of signal φA:

$$|\phi A| = f(|vR| + |vS| + |vT|)dt \qquad (2)$$

Output magnetic flux signal φA is input to divider 11B. In divider 11B, torque command TA output from divider 11A is divided by magnetic flux signal φA output from detector 12X, thereby generating slip frequency command signal SFA*(SFA*=TA/φA).

Slip frequency correction signal SFAB and slip frequency command signal SFA* are added to each other at summing point C, thus calculating slip frequency reference SFA (=SFA*+SFAB). Calculated slip frequency reference SFA is added to frequency FA, corresponding to speed signal N detected by detector 4, at summing point B so as to determine output frequency FB (=FA+SFA) of inverter 6 through pulse generator 14.

Rectifier 5 is controlled, through phase controller 15, by signal VB determined by voltage controller 13, so that a voltage/frequency ratio, corresponding to speed signal N detected by detector 4, is obtained.

Motor 2A is torque-controlled through rectifier 5 and inverter 6, thereby controlling input power P of motor 2A to be preset power reference P*.

In this embodiment, preset power P* is divided by detected speed N to obtain torque reference signal TA, and signal TA is then divided by detected magnetic flux $\phi$A to generate slip frequency reference signal SFA*. Slip frequency reference signal SFA* is used as an auxiliary signal for power control of induction motor 2A. In this manner, even when motor 2A is used as the helper drive apparatus while performing field-weakening control, high-precision power control can be performed.

FIG. 7 shows a modification of the embodiment shown in FIG. 6.

In FIG. 7, synchronous motor 2B is used as an AC motor for helper-driving the load machine (3). Motor 2B supplementarily drives turbine 1. Constant $\gamma$-angle control is employed in a controller, and a current reference (IA) is employed as a torque reference.

Power converter 100E comprises rectifier 5, inverter 6, torque reference generating divider 11A, power amplifier 10, current controller 33, phase controller 15, current transformer 7, potential transformers 8A and 8B, power detector 9, position detector 31, $\gamma$-angle controller 35, speed detector 4, $\gamma$-angle setter 34, and $\gamma$-angle switcher 36 (switcher 36 may be omitted).

An output from AC power supply 16 is converted into AC power of a variable frequency and a variable voltage, via rectifier 5 and inverter 6. The converted AC power is supplied to synchronous motor 2B. Motor 2B is connected to turbine 1 through a shaft, and drives load machine 3.

The rotational speed of motor 2B is maintained to be constant by a governor (not shown) of turbine 1, and load distribution is determined by controlling input power P of motor 2B, in the same manner as in the embodiment shown in FIG. 6.

Input power P of motor 2B is controlled as follows. Signals Ix and VxA from transformers 7 and 8A are input to power detector 9 so as to output power feedback signal PB, using a product of in-phase components of Ix and VxA. Output signal PB is combined with power reference P* at summing point A, thereby calculating deviation PAB. Calculated deviation PAB is input to power amplifier 10. Amplifier 10 then generates current reference correction signal IAB.

On the other hand, power reference P* is divided, at divider 11A, by speed signal N of motor 2B obtained from speed detector 4. Divider 11A generates torque command TA corresponding to power P* designated by speed signal N. Command TA is input to divider 11B.

Signal VB from transformer 8B is input to magnetic flux detector 12X. Detector 12X outputs magnetic flux signal $\phi$A based on equation (2). Output magnetic flux signal $\phi$A is input to divider 11B. In divider 11B, torque command TA output from divider 11A is divided by magnetic flux signal $\phi$A output from detector 12X, thereby generating current command signal IA* (IA*=TA/$\phi$A). Current reference IA* and current reference correction signal IAB are added to each other at summing point B, thus obtaining actual current reference IA. Output current reference IA is supplied to rectifier 5, via current controller 33 and phase controller 15. Rectifier 5 controls motor 2B in accordance with current reference IA.

Position detector 31 electrically detects a magnetic flux position in accordance with signals Ix and VxA from transformers 7 and 8A, and causes $\gamma$-angle controller 35 to control a $\gamma$ angle so that the $\gamma$-angle, set by $\gamma$-angle setter 34, can be set at the detected magnetic flux position. Then, inverter 6 is controlled by a constant $\gamma$ angle.

Synchronous motor 2B is thus torque-controlled by rectifier 5 and inverter 6, and power P of motor 2B is also controlled in correspondence with power reference P*.

In the above embodiment, preset power P* is divided by detected speed N to obtain torque reference signal TA, and signal TA is then divided by detected magnetic flux $\phi$A to obtain current reference signal IA*. Signal IA* is used as an auxiliary signal for power control of motor 2B.

In this manner, even when motor 2B is used as a helper drive apparatus while performing field-weakening control, high-precision power control can be performed.

According to the embodiment shown in FIG. 7, since power control is executed using the current reference, a turbine helper drive apparatus, which can perform high-precision power control even when an AC motor is used in field-weakening control, can be provided.

What is claimed is:

1. A turbine helper drive apparatus adapted to an induction motor coupled to a turbine and its load, and having power converting means for changing an input power supplied to said induction motor in accordance with a predetermined preset power, so that load distribution of said load for said turbine and said induction motor is changed, said power converting means comprising:

power detection means for detecting the input power to said induction motor;

speed detecting means for detecting a rotational speed of said induction motor;

magnetic flux detecting means for detecting a magnetic flux of said induction motor;

a first divider for generating a torque reference signal by dividing the preset power by the rotational speed;

a second divider for generating a slip frequency reference signal by dividing the torque reference signal by the magnetic flux; and power control means for controlling the input power to said induction motor in accordance with the slip frequency reference signal and the predetermined preset power.

2. A turbine helper drive apparatus adapted to a synchronous motor coupled to a turbine and its load, and having power converting means for changing an input power supplied to said synchronous motor in accordance with a predetermined preset power, so that load distribution of said load for said turbine and said synchronous motor is changed, said power converting means comprising:

power detection means for detecting the input power to said synchronous motor;

speed detecting means for detecting a rotational speed of said synchronous motor;

magnetic flux detecting means for detecting a magnetic flux of said synchronous motor;

a first divider for generating a torque reference signal by dividing the preset power by the rotational speed;

a second divider for generating a current reference signal by dividing the torque reference signal by the magnetic flux; and power control means for controlling the input power to said synchronous motor in accordance with the current reference signal and the predetermined preset power.

3. A turbine helper drive apparatus comprising:

a motor coupled to turbine means for driving a load; and power converting means, coupled to said motor, for controlling an output from said motor based on a predetermined power reference, the control being performed such that said motor performs one of a motoring operation, wherein said motor drives said load together with said turbine means, and a regenerating operation, wherein said motor serves as a load for said turbine means to generate an electric power;

said power converting means including speed detecting means for detecting a speed signal corresponding to a rotational speed of said motor; torque reference signal generating means, coupled to said speed detecting means, for generating a torque reference signal obtained by dividing the predetermined power reference by the speed signal; and power control means for supplying an input power depending on the predetermined power reference to said motor based on a combined value of the predetermined power reference and the torque reference signal.

4. A turbine helper drive apparatus comprising:

a motor coupled to turbine means for driving a load; and power converting means, coupled to said motor, for controlling an output from said motor based on a predetermined power reference, the control being performed such that said motor performs one of a motoring operation, wherein said motor drives said load together with said turbine means, and a regenerating operation, wherein said motor serves as a load for said turbine means to generate an electric power;

said power converting means including power detecting means for detecting an input power to said motor, and generating an input power signal indicating the input power; speed detecting means for detecting a speed signal representing a rotational speed of said motor; torque reference signal generating means, coupled to said speed detecting means, for generating a torque reference signal obtained by dividing the predetermined power reference by the speed signal; and power control means for supplying a power corresponding to the predetermined power reference to said motor based on a combined value of the input power signal, the predetermined power reference, and the torque reference signal.

5. An apparatus according to claim 3, wherein said power converting means includes:

power detecting means for detecting said input power to said motor; and wherein said power control means is coupled to said power detecting means.

6. An apparatus according to claim 3, wherein said power converting means includes a voltage inverter for supplying a power to said motor.

7. An apparatus according to claim 3, wherein said power converting means includes an externally-excited current inverter for supplying a power to said motor.

8. An apparatus according to claim 3, wherein said power converting means includes a self-excited current inverter for supplying a power to said motor.

9. An apparatus according to claim 3, wherein said motor comprises an induction motor.

10. An apparatus according to claim 3, wherein said motor comprises a synchronous motor.

11. An apparatus according to claim 4, wherein said power control means is coupled to said power detecting means and said motor.

12. An apparatus according to claim 4, wherein said power converting means includes a voltage inverter for supplying a power to said motor.

13. An apparatus according to claim 4, wherein said power converting means includes an externally-excited current inverter for supplying a power to said motor.

14. An apparatus according to claim 4, wherein said power converting means includes a self-excited current inverter for supplying a power to said motor.

15. An apparatus according to claim 4, wherein said motor comprises an induction motor.

16. An apparatus according to claim 4, wherein said motor comprises a synchronous motor.

* * * * *